Figure 1:
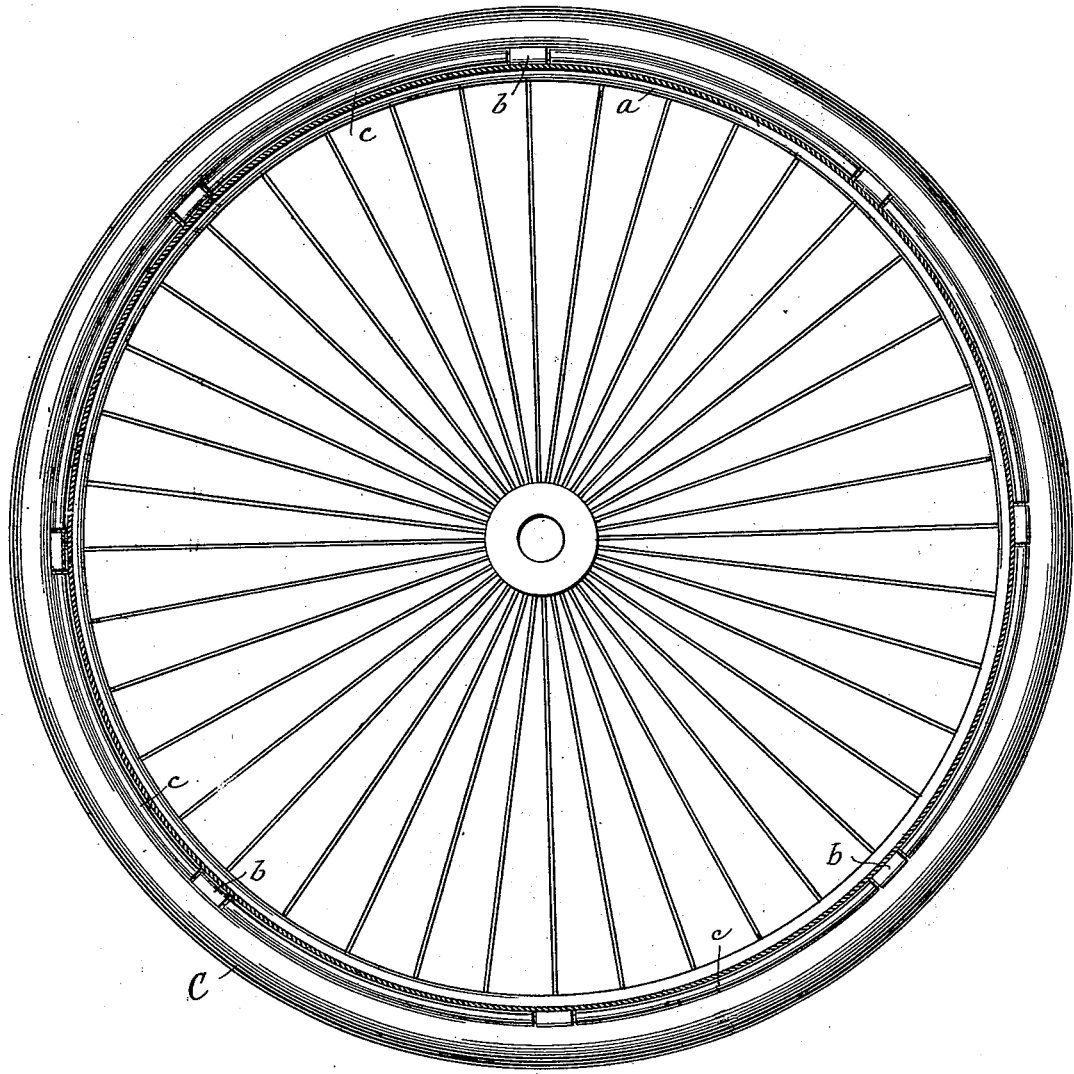

(No Model.) 2 Sheets—Sheet 1.

G. H. CHINNOCK.
PNEUMATIC TIRE.

No. 512,243. Patented Jan. 2, 1894.

WITNESSES:
Frank S. Ober
H. A. Opperman.

INVENTOR,
Geo. H. Chinnock
BY
M. A. Rosenbaum
ATTORNEY.

(No Model.) 2 Sheets—Sheet 2.
G. H. CHINNOCK.
PNEUMATIC TIRE.
No. 512,243. Patented Jan. 2, 1894.
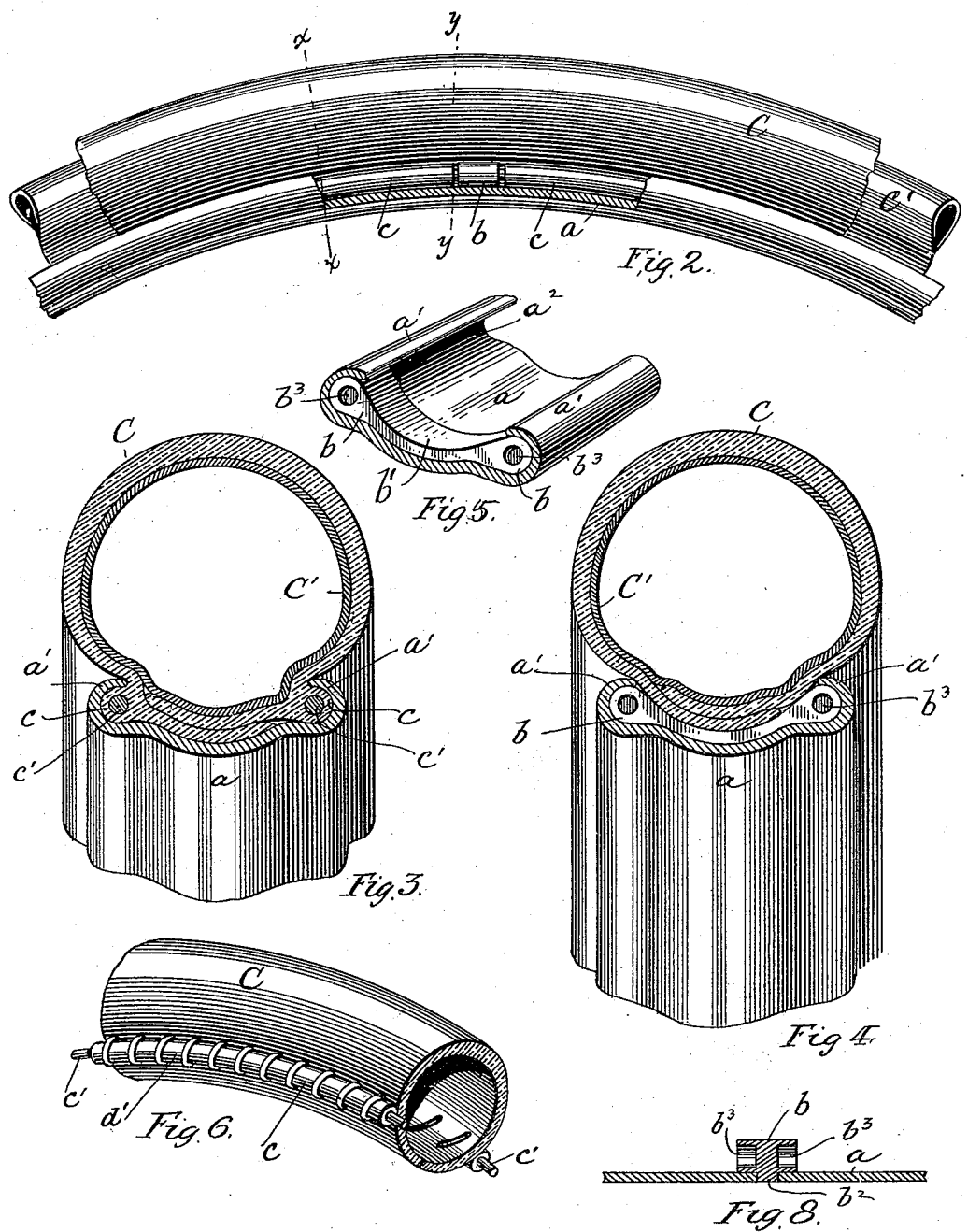

UNITED STATES PATENT OFFICE.

GEORGE H. CHINNOCK, OF BROOKLYN, NEW YORK.

PNEUMATIC TIRE.

SPECIFICATION forming part of Letters Patent No. 512,243, dated January 2, 1894.

Application filed March 15, 1893. Serial No. 466,042. (No model.)

*To all whom it may concern:*

Be it known that I, GEORGE H. CHINNOCK, a citizen of the United States, residing at Brooklyn, in the county of Kings and State of New York, have invented certain new and useful Improvements in Pneumatic Tires, of which the following is a full, clear, and exact description.

My invention relates to pneumatic tires for vehicle wheels, and has special reference to the means of securing the same in the rim or felly of the wheel. One of the most popular methods of securing the tire to the wheel, is by means of two continuous wires or bands applied respectively to the edges of the tire and provided with means for shortening or tightening them upon the wheel. The wires hold the edges or sides of the tire in grooves or seats in the rim of the wheel, and the construction is such, that the greater the air pressure inside of the tire, the stronger will the tire be held in the rim, for the tendency of the air pressure is to force the wires into their seats in the rim.

My invention is a general improvement upon this method of securing the tire in place, and it consists in substituting for the continuous wire or band, a discontinuous or sectional wire or band. These sections are placed in line with each other in the same positions which they would occupy if connected into a continuous band, but their function is to simply form a spring flange which is capable of being forced up and under a ledge or shoulder formed in the rim of the wheel by the air pressure within the tire. This engagement between the sides of the tire and the shoulder on the rim, is an interlocking connection which holds the strongest when the pressure of air is the greatest. By making the flange or band, if it may be so called, in sections which are entirely independent of each other, the sides of the tire are more accurately set against the wheel, because each section will go to its seat independent of the others and any inaccuracy in the rim will be closely followed by the wire section and thus hold the tire in intimate contact with the rim throughout the entire circle of the wheel.

My invention also comprehends the use of fixed stops in the rim which are located between the abutting or adjacent ends of the section of the wire. These stops receive the thrust of the wire whenever there is a tendency to creep, and thus overcome all such tendencies and maintain the parts constantly in their proper position with respect to each other.

My invention will be described in detail with reference to the accompanying drawings, in which—

Figure 1 represents a side elevation of a vehicle wheel, the rim of which is shown in section. Fig. 2 is a detail view on an enlarged scale of a portion of the rim, showing substantially the same thing as in Fig. 1, but more plainly. Fig. 3 is a cross-section of the wheel tire complete taken on line $x, x$ of Fig. 2. Fig. 4 is a section of the same part taken on line $y, y$ of Fig. 2. Fig. 5 is a sectional perspective of the wheel rim showing one of the stops therein. Fig. 6 illustrates one method of securing the wire sections to the tire. Fig. 7 is a perspective view of a modified form of stop. Fig. 8 is a section thereof, showing how it is applied to the rim.

Referring to the drawings by letter, $a$ represents the rim or felly of a wheel; it is provided on each edge with an inwardly turned ledge or shoulder $a'$, forming a lateral, underset groove $a^2$. In these grooves, at regular intervals around the entire rim, I place stops $b$, consisting of short blocks or lugs of metal which entirely fill the groove. These stops are preferably made in pairs, the mates of each pair being located in opposite grooves and connected together by a thin web $b'$, which follows the bottom of the felly. I do not confine myself to this manner of making the stops, however, as those on one side may be made entirely separate from those on the other. For instance, the stop may consist of a cylindrical block set in the groove. Whatever form the stops may have, they are to be fixed rigidly and permanently in the rim of the wheel in some manner. They may be soldered in place, or they may have short lugs $b^2$, as shown in Fig. 7, which project through openings in the rim; soldering may be used in connection with this latter method also. The object is to prevent their movement after they are attached to the rim. I prefer, although it is not absolutely necessary, that the opposite sides of the stops shall be provided with a cavity $b^3$, and, if necessary, a lateral opening $b^4$ made in the stop, for purposes which will hereinafter appear.

C represents the wheel tire; it is sometimes called a jacket or shoe and may itself constitute an air chamber, but it is preferred to use a separate air chamber or inflation tube C' located within it. The tire is provided on its outer side near each edge with a spring flange $c$, made in sections which are defined by short spaces about equal in length to the length of the stops $b$ in the rim of the wheel. These spring flanges may be formed in various ways. In the construction shown in Figs. 1, 2, and 3, the flanges are formed by lengths of steel, or other suitable wire $c'$ covered by a sheathing of rubber or other material, and secured to the outer sides of the tire by vulcanizing it thereto. The sheathing of rubber or other material prevents the corrosion of the wire. The flange may also be put on by folding the material of the tire around it. In Fig. 6, I have shown still another method of securing the flange to the tire, which consists in first covering the wire with a rubber tube $d'$, and then sewing or strapping it to the side of the tire by passing a continuous cord or thread spirally around it and through the walls of the tire, as shown. Therefore, my invention is not confined to any special manner of forming or attaching the spring flange upon the sides or edges of the tire. It is preferable that in whatever way the flange is formed, it should have a core of strong, flexible material, such as a steel wire, as described. The sections of wire when put in place will be straight, so that when they are bent to conform to the rim of the wheel, they will press and hug the upper side of the groove which receives them. When the tire is adjusted to the wheel, these flanges occupy the side grooves in the rim, and when the tire is inflated, the pressure from within forces the flanges into the grooves and under the ledges $a'$ thus holding the tire in place.

When the tire is adjusted to the rim, it is set so that the spaces between the adjacent ends of the flanges will be occupied by the stops $b$ in the rim, and the ends of the wires of the sections will, therefore, abut squarely against these stops and will, be prevented from partaking of a longitudinal movement, or as it is called, "creeping" or "cropping." It is preferred that the ends of the wire shall project from the rubber covering slightly and that these portions shall enter the sockets or cavities in the opposite sides of the stops. This prevents the wires from flying out of the groove when the wire is deflated. It may also be desirable to cut a notch in the side of the stops, a little below the center, as shown in Fig. 7, to admit the end of the wire into the cavity of the stop from the side.

A tire of this construction is easily and conveniently fitted to the wheel. If each of the flanges is made up of eight sections, as shown in Fig. 1, then one-eighth of the tire will be first inserted; this will be followed by the next section, and so on all around until the tire is completely in the rim. This will be an easy operation, because the wire sections are movable independent of each other, and the tire is more flexible and can be bent into the positions required to set the flanges in their seats. When once the flanges are passed under the ledges $a'$, they will jump into the seats of themselves and their tendency is always in an outward direction. So far as known to me, all continuous wire fastenings have held the tire in place by a radial pressure upon the rim toward the center of the wheel, while in this case the tire is held by an outward radial pressure, which tends to hold the spring flange under the ledge.

In the drawings I have shown the sectional flange located some distance from the edge of the tire, and the flaps which are thus formed are caused to overlap each other on the bottom of the rim. This protects the air chamber from injury due to rubbing on the heads of the spokes or other projecting portions in the rim; but as the rim of the wheel is of less circumference than the outer side of the tire, the flaps will be likely to wrinkle and this wrinkling is nicely taken up by the double stops shown in Fig. 5. The flaps will lie in the bottom of the rim between the stops and the slack will be partly taken up in passing over the stops.

Having thus described my invention, I claim—

1. The combination with a wheel rim having inwardly turned side ledges, of a pneumatic tire having sectional flanges at or adjacent to its edges adapted to engage with the ledges to hold the tire in the rim, and abutting points against which the ends of the flange impinge substantially as described.

2. The combination with a wheel rim having inwardly turned side ledges, of a pneumatic tire having sectional flanges at or adjacent to its edges adapted to engage with the ledges to hold the tire in the rim, and stops in said rim to prevent the longitudinal movement of the flange sections.

3. The combination with a wheel rim provided with retaining ledges, of a pneumatic tire having embedded or otherwise attached to it, a wire which forms a bead or flange thereon, said wire being divided into a plurality of separate and independent sections or lengths, for the purpose set forth.

4. A wheel rim provided with an inwardly turned side ledge forming a groove, a plurality of stops located at intervals in said groove around the rim, in combination with a pneumatic tire provided with a sectional or discontinuous flange, the sections of which occupy the groove between the stops and abut against the stops to prevent their longitudinal movement.

5. The combination with a wheel rim having inwardly turned side ledges, of a pneumatic tire having independent or sectional flanges at or adjacent to its side edges adapted to engage with the ledges to hold the tire in the rim, said flanges being formed of material which tends to spring outward for the purpose set forth.

In testimony whereof I subscribe my signature in presence of two witnesses.

GEORGE H. CHINNOCK.

Witnesses:
FRANK S. OBER,
WM. A. ROSENBAUM.